United States Patent [19]

Maekawa et al.

[11] Patent Number: 5,868,953
[45] Date of Patent: Feb. 9, 1999

[54] METHOD FOR MANUFACTURING A MAGNETIC DISK SUBSTRATE

[75] Inventors: Masashi Maekawa; Nobuo Kawasaki; Yasuyuki Kawashima; Yoshio Karasawa, all of Sagamihara, Japan

[73] Assignee: Kabushiki Kaisya Ohara, Japan

[21] Appl. No.: 551,126

[22] Filed: Oct. 31, 1995

[30] Foreign Application Priority Data

Nov. 16, 1994 [JP] Japan ................... 6-306840

[51] Int. Cl.$^6$ .............. B44C 1/22; C03C 10/00
[52] U.S. Cl. ............ 216/89; 252/79.1; 51/308; 51/309; 501/4
[58] Field of Search ............ 216/89; 252/79.1; 51/308, 309

[56] References Cited

U.S. PATENT DOCUMENTS

| | | | |
|---|---|---|---|
| 4,690,846 | 9/1987 | Wada et al. | 428/64 |
| 5,228,886 | 7/1993 | Zipperian | 51/293 |
| 5,391,522 | 2/1995 | Goto et al. | 501/4 |
| 5,571,373 | 11/1996 | Krishna et al. | 156/636.1 |
| 5,580,363 | 12/1996 | Goto et al. | 65/29.18 |

Primary Examiner—R. Bruce Breneman
Assistant Examiner—Michael E. Adjodha
Attorney, Agent, or Firm—Hedman, Gibson & Costigan, P.C.

[57] ABSTRACT

A method for manufacturing a magnetic disk substrate includes a step of polishing a glass-ceramic having a crystal phase consisting of crystal grains having an average diameter of less than 3 $\mu$m with a polishing material having a grain diameter smaller than the diameter of the crystal grain. In one aspect of the invention, the glass-ceramic includes lithium disilicate ($Li_2O$—$2SiO_2$) and alpha-quartz (alpha-$SiO_2$) as predominant crystal phases and grown crystal grains of the alpha-quartz each have a globular grain structure consisting of aggregated particles and have a diameter within a range of 0.3 $\mu$m–3.0 $\mu$m.

8 Claims, 6 Drawing Sheets

METHOD FOR MANUFACTURING A MAGNETIC DISK SUBSTRATE

BACKGROUND OF THE INVENTION

This invention relates to a method for manufacturing a magnetic disk substrate made of glass-ceramic having an improved surface characteristic after polishing.

There is an increasing demand for a magnetic disk as an external storage medium of an office computer and a personal computer and various developments have been made for improving characteristics of a magnetic disk. A substrate for a magnetic disk is generally required to have the following characteristics:

(1) In the CSS (contact-start-stop) characteristic (hereinafter referred to as "CSS characteristic") of a magnetic disk, if the disk has a smooth surface having surface roughness (Ra) below 15Å, sticking between the head and the disk occurs due to increase in contact resistance caused by high rotation of the disk and, for this reason, the surface roughness (Ra) should be larger than 15Å. Further, if the surface of the disk is a rough one having the surface roughness (Ra) exceeding 50Å, damage of the head or the disk tends to take place and, for this reason, the surface roughness (Ra) should not exceed 50Å.

(2) There is tendency to reducing glide height (i.e., interval between the head and surface of the disk) for improving recording density of the magnetic disk and, for this reason, the surface of the disk should be flat and smooth to such extent that a desired glide height can be achieved.

(3) The magnetic disk substrate should be free from crystal anisotropy and other defects and should have fine and uniform texture.

(4) The substrate should have mechanical strength and hardness which are sufficient for standing high speed rotation of the disk and contact with the head.

(5) The substrate should not include $Na_2O$ ingredient in its material because if the substrate includes the $Na_2O$ ingredient, a Na ion is diffused in the substrate during a film forming process with resulting deterioration in the characteristics of the substrate.

(6) The substrate should have chemical durability for resisting rinsing and etching with various chemicals.

An aluminum alloy has generally been used as a magnetic disk substrate in the past. The aluminum alloy however tends to develop undesirable projections or spot-like projections and depressions on the surface of the surface of the substrate during a polishing process due to various defects existing inherently in the material with resulting deficiency in its flatness and surface roughness. The aluminum alloy therefore cannot satisfy the current demand for high density recording required for coping with increase in the amount of information.

Known also in the art are various types of magnetic disk substrates made of a chemically reinforced glass which have been developed for eliminating the above described disadvantages of the magnetic disk substrate made of aluminum alloy. These magnetic disk substrates made of a chemically reinforced glass however have the following disadvantages:

(1) Since polishing of the substrate is made after the chemical reinforcing processing, the reinforced layer tends to become instable as the thickness of the magnetic disk is decreased.

(2) The substrate must be subjected to a mechanical or chemical texturing in order to improve the contact-start-stop characteristic and this requirement makes it difficult to manufacture magnetic disks in a large scale and at a low cost.

(3) Since the substrate includes $Na_2O$ as an essential ingredient, the film forming characteristic is deteriorated and, as a result, a surface coating process becomes necessary. Further, for eliminating the requirement for the texturing for improving the contact-start-stop characteristic in the chemically reinforced glass or glass-ceramics, a process has recently been developed for making the surface of the substrate rough. This process however is also insufficient for producing magnetic disks in a large scale and at a low cost.

Some glass-ceramics are known as materials satisfying some of the above described requirements. For example, Japanese Patent Application Laid-open No. Sho 60-229234 discloses a $SiO_2$—$Al_2O_3$—$Li_2O$ system glass-ceramic which includes alpha-quartz solid solution or beta-spodumene solid-solution as a main crystal phase and consists of crystal grains having a diameter of about 0.1–1.0 $\mu$m. Japanese Patent Application Laid-open No. Sho 62-72547 discloses a $SiO_2$—$Li_2O$ system glass-ceramic which includes, as main crystal phases, granular lithium disilicate having a grain diameter of about 0.3–1.5 $\mu$m and granular lithium metasilicate having a grain diameter of about 0.3–0.5 m. U.S. Pat. No. 3,231,456 discloses a $Sio_2$—$Li_2O$—$P_2O_5$—MgO system glass-ceramic added with CuO and SnO ingredients which includes lithium disilicate and as a main crystal phase and alpha-quartz as a subsidiary crystal phase.

U.S. Pat. No. 3,977,857 discloses a $SiO_2$—$Li_2O$—MgO—$P_2O_5$—($Na_2O+K_2O$) system glass-ceramic which is suitable as a material which adheres directly to a metal material. The U.S. Patent describes that the main crystal phase of this glass-ceramic is $Li_2O \cdot 2SiO_2$.

Japanese Patent Application Laid-open No. Sho 63-210039 discloses a $SiO_2$—$Li_2O$—MgO—$P_2O_5$ system glass-ceramic which is suitable for use as a magnetic disk substrate. This publication describes that the main crystal phases of this glass-ceramic are $Li_2O \cdot 2SiO_2$ and alpha-cristobalite.

In the prior art $Li_2O$—$SiO_2$ system glass-ceramics (Japanese Patent Application Laid-open No. Sho 62-72547, U.S. Pat. No. 3,232,456, U.S. Pat. No. 3,977,857 and Japanese Patent Application Laid-open No. Sho 63-210039, crystal phases grown are $Li_2O \cdot 2SiO_2$ as a main crystal phase and a small amount of $SiO_2$ ( alpha-cristobalite or alpha-quartz). In these prior art glass-ceramics, it is the $Li_2O \cdot 2SiO_2$ crystal phase as the main crystal phase and not the alpha-quartz or alpha-cristobalite crystal phase that performs a principal function. These prior art glass-ceramics cannot provide, as a surface characteristic existing inherently in the glass-ceramics after polishing, the surface roughness of 15Å–50Å which is necessary for the CSS characteristic of a magnetic disk. For this reason, for improving the CSS characteristic required for a magnetic disk substrate, some texturing processing is required after the polishing process for making the surface of the glass-ceramic rough. This prevents a large scale production of a magnetic disk having the above described characteristics at a low cost.

For overcoming the above described disadvantages of the prior art magnetic disk substrates, the assignee of the present invention has found, as a result of studies and experiments made for the purpose of eliminating the above described disadvantages of the prior art magnetic disk substrates and providing a magnetic disk substrate made of a glass-ceramic which has an excellent surface characteristic after polishing by controlling the crystal structure and crystal grains of crystal grown in the glass-ceramic, and providing also a method for manufacturing the magnetic disk substrate, that a glass-ceramic obtained by subjecting a $SiO_2$—$Li_2O$—$P_2O_5$ system glass including MgO as an essential ingredient to a heat treatment under a strictly limited temperature range has a microstructure in which alpha-quartz (alpha-$SiO_2$) in the form of aggregated globular particles is randomly grown in a uniform crystal phase of lithium disilicate($Li_2O \cdot 2SiO_2$) and that, since this microstructure consists of the lithium disilicate phase which is mechanically and chemically instable and the alpha-quartz phase which is mechanically and chemically stable, projections and depressions are produced on the surface of the glass-ceramic substrate after polishing owing to mechanical and chemical actions produced by lapping and polishing processes, and that a magnetic disk substrate having an excellent surface characteristic after polishing can be obtained by controlling the diameter of the aggregated particles of alpha-quartz.

This magnetic disk substrate is one described in the specification of U.S. patent application Ser. No. 08/307,889 filed on Sep. 16, 1994 which is made of a glass-ceramic having lithium disilicate ($Li_2O \cdot 2SiO_2$) and alpha-quartz (alpha-$SiO_2$) as predominant crystal phases, in which grown crystal grains of alpha-quartz (alpha-$SiO_2$) have a globular grain structure each consisting of aggregated particles, the globular grain have a diameter within a range of 0.3 $\mu$m–3.0 $\mu$m, and the surface roughness (Ra) of the surface the substrate after polishing is within a range of 15Å–50Å. The glass-ceramic substrate can be obtained by subjecting to a heat treatment a base glass consisting in weight percent of 65–83% $SiO_2$, 8–13% $Li_2O$, 0–7% $K_2O$, 0.5–5% MgO+ZnO+PbO in which 0.5–5% MgO, 0–5% ZnO, 0–5% PbO, 1–4% $P_2O_5$, 0–7% $Al_2O_3$ and 0–2% $As_2O_3$ +$Sb_2O_3$.

In the CSS characteristic of a magnetic disk, the surface roughness (Ra) of the disk should be within the range of 15Å–50Å and the above described glass-ceramic developed by the assignee of the present invention can achieve this surface roughness of 15Å–50Å without the necessity for a mechanical or chemical texturing. However, decrease in the glide height necessary for increasing recording density of a magnetic disk cannot be automatically achieved by achieving the surface roughness of 15Å–50Å.

The glide height is determined on the basis of surface roughness (Ra) and surface waviness (Wa) of the magnetic disk substrate. The glide height is lower as a value of each characteristic (Ra or Wa) is smaller. As an index indicating a limit value of glide height, GABP (glide avalanche break point, its unit being "microinch" ($\mu$")) is currently employed. GABP presently required for a magnetic disk substrate is in the order between 1.0 $\mu$" to 1.5 $\mu$" but a smaller glide height will be required as a demand for a high density recording becomes stronger.

Polishing of glass-ceramics has been generally carried out by using a polishing material such as cerium oxide having a grain diameter of 1 $\mu$m to 2 $\mu$m which is generally used for polishing optical glasses. In the case of the above described glass-ceramic developed by the assignee of the present invention, however, glide height of GABP exceeding 0.8 $\mu$" only can be achieved by this conventional polishing method, though the surface roughness within the range of 15Å–50Å can be achieved. Thus, it has been found that it is difficult to achieve a glide height of GABP 0.8 $\mu$" or below by the conventional method and therefore the conventional polishing method cannot cope with the future requirement for a reduced glide height.

The invention has been made to overcome the above described problem arising in achieving by polishing of a glass-ceramic a very small glide height required for achieving a high density recording.

It is, therefore, an object of the present invention to provide a method for manufacturing a magnetic disk substrate made of glass-ceramic which can satisfy the requirement for reduction in the glide height which will occur in future.

SUMMARY OF THE INVENTION

For achieving the object of the invention, the inventors of the present invention have made studies and experiments which have resulted in a finding, which has led to this invention, that by polishing a glass-ceramic having a crystal phase consisting of crystal grains having an average diameter of less than 3 $\mu$m with a polishing material having a grain diameter smaller than the diameter of the crystal grains, a magnetic disk substrate made of a glass-ceramic having projections of crystal grains of a uniform height and having very small waviness on the surface of the substrate can be obtained and, as a result, a magnetic disk substrate having a smaller glide height than a magnetic disk substrate obtainable by the conventional polishing method can be provided.

According to the invention, there is provided a method for manufacturing a magnetic disk substrate comprising a step of polishing a glass-ceramic having a crystal phase consisting of crystal grains having an average diameter of less than 3 $\mu$m with a polishing material having a grain diameter smaller than the diameter of the crystal grains.

Fine projections and depressions are generally produced on the surface of a glass-ceramic after polishing due to difference in wear between crystal phases or between a crystal phase and an amorphous glass phase contained in the glass-ceramic. There is also difference in the surface structure of a glass-ceramic due to the size and shape of crystal grains contained.

The above described glass-ceramic which has been developed by the assignee of the present invention has a special crystal structure in which the globular crystal grains of alpha-quartz each consisting of aggregated particles which are inherently stronger mechanically and chemically than lithium disilicate ($Li_2O \cdot 2SiO_2$) have grown randomly in the lithium disilicate crystal grains and, owing to this crystal structure, the crystal grains of lithium disilicate are ground faster than the crystal grains of alpha-quartz and, as the polishing process progresses, the crystal grains of alpha-quartz project fairly prominently from the surface of the lithium disilicate crystal grains with the result that the surface roughness (Ra) within an ideal range of 15Å–50Å is achieved. This surface roughness can be attained sufficiently by polishing the glass-ceramic with a polishing material which is generally used for polishing such as cerium oxide.

It has however been found that, when this glass-ceramic in which the crystal grains of alpha-quartz have an average diameter of, for example, 0.5 $\mu$m is polished with a conventional material made of cerium oxide having a grain diameter of 1.2 $\mu$m, i.e., when the glass-ceramic is polished under the condition that the grain diameter of a polishing material is larger than the diameter of the crystal grains, the surface of the glass-ceramic is ground coarsely and a uniform height of the projections of alpha-quartz crystal grains cannot be maintained with the result that relatively large waviness remains on the surface of the glass-ceramic.

According to the invention, by polishing the glass-ceramic with a polishing material having a grain diameter, e.g., less than 0.5 $\mu$m in the above example, which is smaller than the diameter of the crystal grain, the crystal grains project at a substantially uniform height from the surface of the glass-ceramic and, besides, a portion between the crystal grains is polished smoothly and, as a result, waviness on the surface becomes small whereby a smaller glide height can be obtained.

As the polishing material, any polishing material may be used if the grain diameter thereof is smaller than the grain diameter of crystal grains. For example, cerium oxide, colloidal silica, zirconium oxide, aluminum oxide, chromium oxide and carbon silicide may be used as such polishing material. Among these polishing materials, colloidal silica is most preferable because the grain diameter thereof is significantly smaller than those of the other polishing materials.

According to the method of the present invention, the glass-ceramic may be polished by using only a polishing material having a grain diameter smaller than the diameter of crystal grains. This method however takes much time and, besides, a polishing material such as colloidal silica is costly. For overcoming this problem, according to one aspect of the invention, the glass-ceramic is preferably polished initially with a polishing material having a grain diameter, e.g., cerium oxide having a grain diameter of 1.2 $\mu$m in the above example, which is substantially equal to or larger than the grain diameter of the crystal grains and then the glass-ceramic is polished further with a polishing material having a grain diameter, e.g., colloidal silica having a grain diameter of 0.08 $\mu$m, which is smaller than the diameter of the crystal grains.

The present invention can be applied most advantageously to the above described glass-ceramic developed by the assignee of the present application. That is, in one aspect of the invention, the glass-ceramic includes lithium disilicate ($Li_2O \cdot 2SiO_2$) and alpha-quartz (alpha-$SiO_2$) as predominant crystal phases and grown crystal grains of the alpha-quartz each have a globular grain structure consisting of aggregated particles and have a diameter within a range of 0.3 $\mu$m–3.0 $\mu$m.

In a preferred form, said glass-ceramic is obtained by subjecting to a heat treatment a base glass which consists in weight percent of 65–83% $SiO_2$, 8–13% $Li_2O$, 0–7% $K_2O$, 0.5–5.5% $MgO+ZnO+PbO$ in which 0.5–5.5% $MgO$, 0–5% $ZnO$, 0–5% $PbO$, 1–4% $P_2O_5$, 0–7% $Al_2O_3$, 0–2% $As_2O_3 + Sb_2O_3$.

As a result of conducting numerous experiments, it has been found that in the glass-ceramic of the present invention, when the ratio Wa/Ra of surface waviness Wa to surface roughness Ra is 0.5 or below, a preferable glide height of GABP 0.8 $\mu$" or below can be obtained. Accordingly, in a preferred aspect of the invention, Wa/Ra should be 0.5 or below.

The method according to the invention is applicable not only to production of the above described glass-ceramic developed by the assignee of the present application but also to production of other glass-ceramics including other crystal phases such as $SiO_2$, $Li_2Si_2O_5$, beta-spodumene, gehlenite, gahnite and canasite.

DETAILED DESCRIPTION OF THE INVENTION

As a base glass for manufacturing the above described glass-ceramic developed by the assignee of the present invention, various types of glass compositions are available for use. Some preferred examples of such glass composition will be described below.

The composition of the glass-ceramic constituting a magnetic disk substrate can be expressed on the basis of a composition of oxides as in its base glass. The content ranges of the respective ingredients in the preferred examples have been selected for the reasons stated below.

The $SiO_2$ ingredient is an important ingredient which produces alpha-quartz ($SiO_2$) and lithium disilicate ($Li_2O \cdot 2SiO_2$) as crystal phases by heat treating the base glass. If the amount of this ingredient is below 65%, the crystal produced in the glass-ceramic is instable and its texture tends to become too rough. If the amount of this ingredient exceeds 83%, difficulty arises in melting the base glass. As a result of experiments, it has been found that a particularly preferable range of this ingredient is from 70% to 82%.

The $Li_2O$ ingredient is also an important ingredient which produces lithium disilicate ($Li_2O \cdot 2SiO_2$) crystal as a crystal phase by heat treating the base glass. If the amount of this ingredient is below 8%, growth of this crystal becomes difficult and melting of the base glass becomes also difficult. If the amount of this ingredient exceeds 13%, the grown crystal of the glass-ceramic becomes instable and its texture tends to become too rough and, besides, chemical durability and hardness of the glass-ceramic are deteriorated. It has been found that a particularly preferable range of this ingredient is from 8% to 11%.

The $K_2O$ ingredient is an ingredient which improves melting property of the base glass and can be included up to 7%. A particularly preferable range of this ingredient is from 1% to 6%.

The MgO ingredient is an important ingredient which has been found in the present invention to cause a globular crystal grain of aggregated particles of alpha-quartz ($SiO_2$) as the crystal phase to grow randomly in the entire glass. If the amount of this ingredient is below 0.5%, the above described effect cannot be obtained whereas if the amount of this ingredient exceeds 5.5%, growth of a desired crystal becomes difficult. A particularly preferable range is from 1% to 5%.

The ZnO and PbO ingredients may also be added because they have a function similar to that of MgO. If the amount of the ZnO or PbO ingredient exceeds 5%, growth of a desired crystal becomes difficult. A particularly preferable range of ZnO is from 0.2% to 5%.

For the same reason, the total amount of the MgO, ZnO and PbO ingredients should be within the range from 0.5 to 5.5%.

The $P_2O_5$ ingredient is an essential ingredient as nucleating agent for the glass-ceramic. If the amount of this ingredient is below 1%, a desired crystal cannot be produced whereas if the amount of this ingredient exceeds 4%, the grown crystal of the glass-ceramic becomes instable and too rough and, besides, its stability against devitrification is deteriorated. A particularly preferable range of this ingredient is from 1% to 3%.

The $Al_2O_3$ ingredient is an effective ingredient for improving chemical durability of the crystallized glass-ceramic. If the amount of this ingredient exceeds 7%, the melting property of the base glass is deteriorated and, as a result, the rate of crystal growth of alpha-quartz (alpha-$SiO_2$) as the main crystal phase is reduced. A particularly preferable range of this ingredient is from 1% to 6%.

The $As_2O_3$ and/or $Sb_2O_3$ ingredients may be added as refining agents in melting the base glass. It will suffice if the total amount of one or both of these ingredients up to 2% is added to the glass.

In addition to the above described ingredients, one or more of $B_2O_3$, CaO, SrO, BaO, $TiO_2$ and $ZrO_2$ ingredients may be added in a small amount within the range in which desired properties of the glass-ceramic according to the invention will not be impaired.

For manufacturing the magnetic disk substrate according to the invention, the base glass having the above described composition is molten and after being subjected to heat forming and/or cold forming, is heat treated for producing a crystal nucleus under a temperature within a range from 450° C. to 540° C. for about 1 to 5 hours and is further heat treated for crystallization under a temperature within a range from 700° C. to 840° C. for about 1 to 5 hours. If the temperature of nucleation is below 450° C., nucleation caused by phase separation due to the $P_2O_5$ ingredient is insufficient whereas if the temperature of nucleation exceeds 540° C., microcrystals of $Li_2O \cdot SiO_2$ which grow as the crystal nucleus fail to grow uniformly and also become gross crystal nucleus and, for this reason, such gross crystal nucleus of lithium monosilicate prevents aggregation of small particles of alpha quartz which subsequently grow and causes them to scatter and grow as monospherical grains of alpha-quartz instead of globular grains each being made of aggregated particles.

The temperature of crystallization, associated with the effect caused by the MgO ingredient, performs a very important function for controlling the size of the globular grain of aggregated particles of alpha-quartz (alpha-$SiO_2$). If the temperature of crystallization is below 700° C., the crystal of alpha-quartz will not grow sufficiently whereas if the temperature of crystallization exceeds 840° C., it becomes difficult to maintain the globular grain structure of aggregated particles with resulting failure in obtaining the above described advantage of the invention.

The glass-ceramic thus heat treated is then subjected to a lapping process and finally to a polishing process in which the surface of the glass-ceramic is polished with a polishing material having a grain diameter smaller than the diameter of the crystal grains to provide a magnetic disk substrate having the surface roughness (Ra) within the range from 15Å to 50Å, the ratio Wa/Ra between the surface waviness Wa and the surface roughness Ra is 0.5 or below and GABP is 0.8 $\mu$" or below.

In a preferred embodiment of the invention, the glass-ceramic is initially polished with a polishing material having a grain diameter which is larger than the diameter of the crystal grains and then further polished with a polishing material having a grain diameter which is smaller than the diameter of the crystal grains.

The polishing can be performed by a conventional method using a known polisher and a conventional device used generally for polishing either one surface or both surfaces of a glass-ceramic.

BRIEF DESCRIPTION OF THE DRAWINGS

In the accompanying drawings.

EXAMPLES

Some examples of the magnetic disk substrate according to the invention will be described below with reference to the accompanying drawings.

EXAMPLE 1

For manufacturing a glass-ceramic, materials including 76.7% $SiO_2$, 10.5% $Li_2O$, 3.8% $Al_2O_3$, 2.5% MgO, 0.5% ZnO, 4.0% $K_2O$, 2.0% $P_2O_5$ and 0.5% $As_2O_3$ were mixed and molten in a conventional melting apparatus at a temperature within the range from about 1350° C. to about 1500° C. The molten glass was stirred to homogenize it and thereafter formed into a desired shape and annealed to provide a formed glass. Then, this formed glass was subjected to a heat treatment to produce the crystal nucleus at 540° C. for about five hours and then was subjected to further heat treatment for crystallization at 780° C. for two hours to produce a glass-ceramic having lithium disilicate ($Li_2O \cdot 2SiO_2$) and alpha-quartz (alpha-$SiO_2$) as predominant crystal phases, said crystal phase of alpha-quartz being formed of grown crystal grains each having a globular grain structure made of aggregated particles. An average grain diameter of the globular grains of alpha-quartz was 1.2 $\mu$m according to an observation through an electronic microscope. This glass-ceramic was lapped for about 60 minutes with GC polishing grains having an average grain diameter of 11.5 $\mu$m.

A hard type polishing cloth made of a non-woven fabric was mounted on a ratary table of a dual surface polishing apparatus and the formed glass-ceramic which had been subjected to the lapping process was mounted on the rotary table of the polishing apparatus. Polishing was performed at a polising load of 120 g/cm$^2$ for 70 minutes by rotating the rotary table and supplying slurry made of cerium oxide polishing grains having an average grain diameter of 1.2 $\mu$m suspended in water at a concentration of 20 weight perecent (pH 7.4) at a speed of 3 liter per minute for each formed glass-ceramic.

Then, polishing was performed further at a polishing load of 60 g/cm$^2$ for 5 minutes by supplying colloidal silica containing 40 weight percent silica particles each having an average grain diameter of 0.08 $\mu$m (pH 9.5) at a speed of 0.2 liter per minute for each formed glass-ceramic to produce a magnetic disk substrate.

Figure 1A:
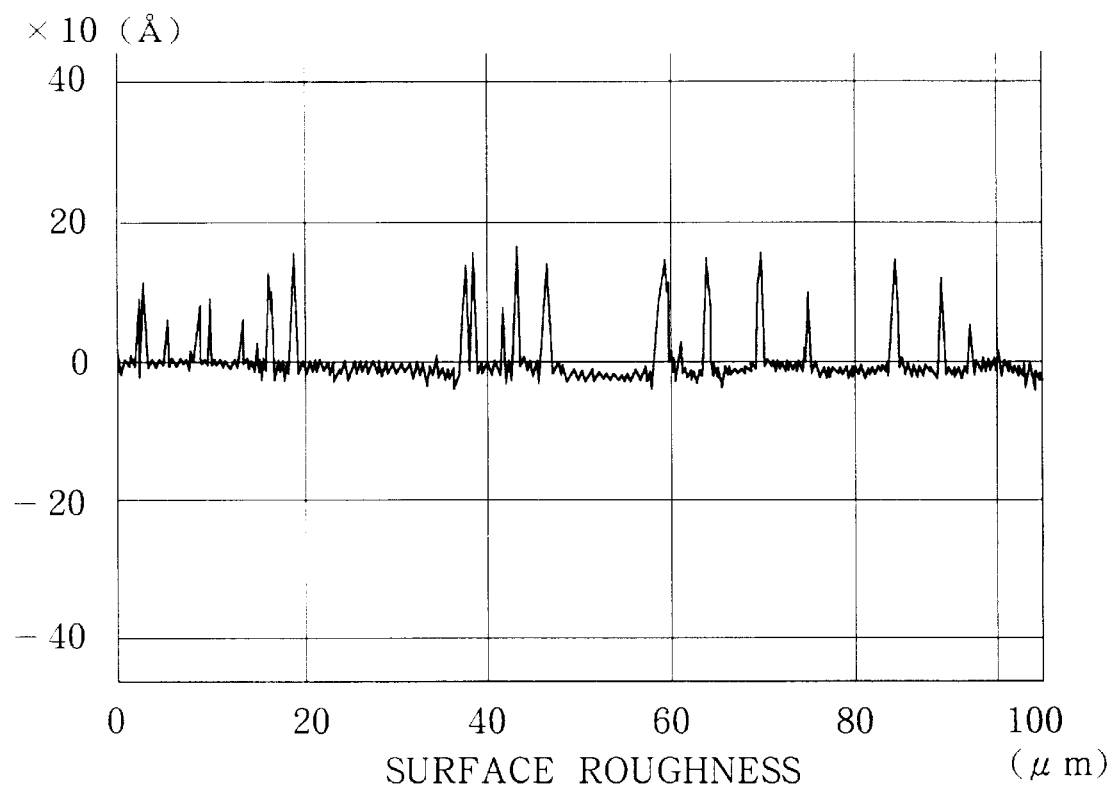
FIGS. 1A and 1B are graphs showing profiles after polishing of an example of the magnetic disk substrate made of the glass-ceramic according to the invention.
Figure 1B:
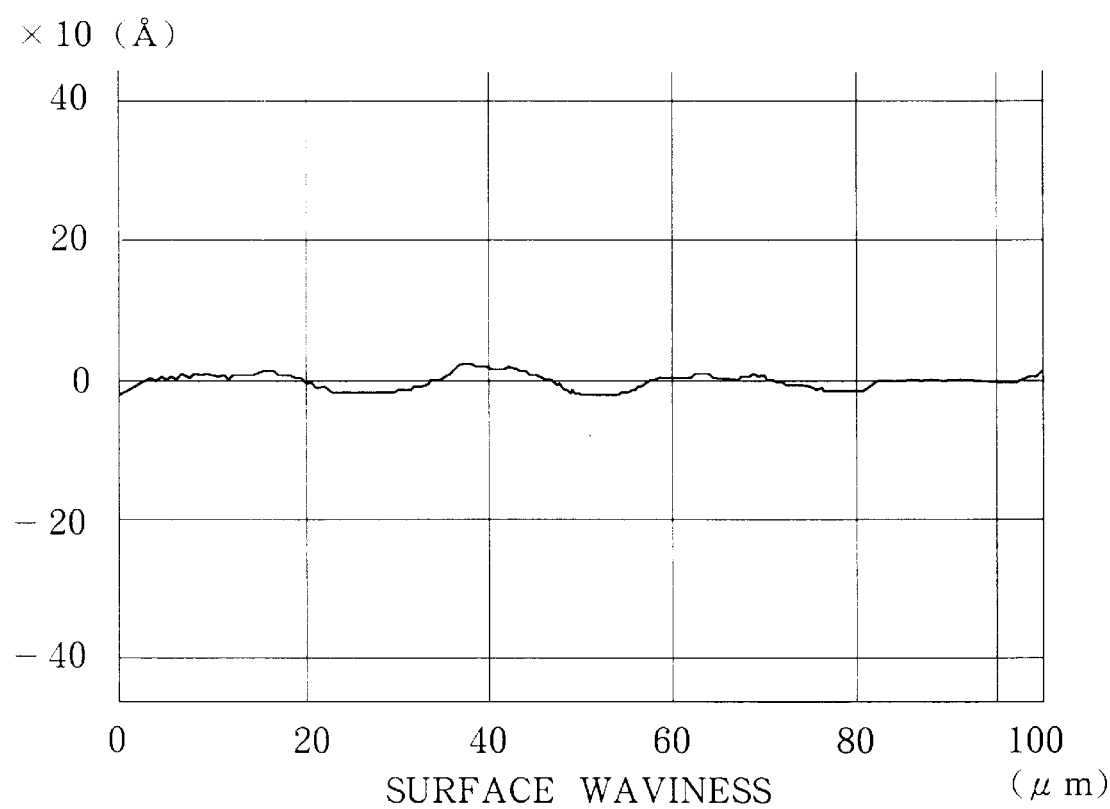

The average surface roughness (Ra), peak surface roughness (Rp) and average surface waviness (Wa) of the magnetic disk substrate thus produced were measured by using a touch-needle type surface roughness meter Tencor-P2. Measured Ra was 18Å, Rp 127Å and Wa 9Å respectively. Surface profiles of the glass-ceramic substrate are shown in FIGS. 1A and 1B. FIG. 1A shows the surface roughness and FIG. 1B the surface waviness.

The glass-ceramic substrate was subjected to a film forming process which is known per se and thereby was formed into a high recording density magnetic disk. More specifically, the glass-ceramic substrate was heated in a vacuum state and subsequently was coated, by a sputtering process, with an intermediate layer of chromium, a magnetic layer of cobalt alloy and a protective layer of carbon and then was coated with a lubricating material layer on the surface of the protective layer to provide a magnetic disk. GABP of this magnetic disk was measured by using an RX-2000 type glide tester made by Hitachi Electronic Engineering Co., Ltd. The measured GABP was 0.61 $\mu$".

EXAMPLE 2

Figure 2A:
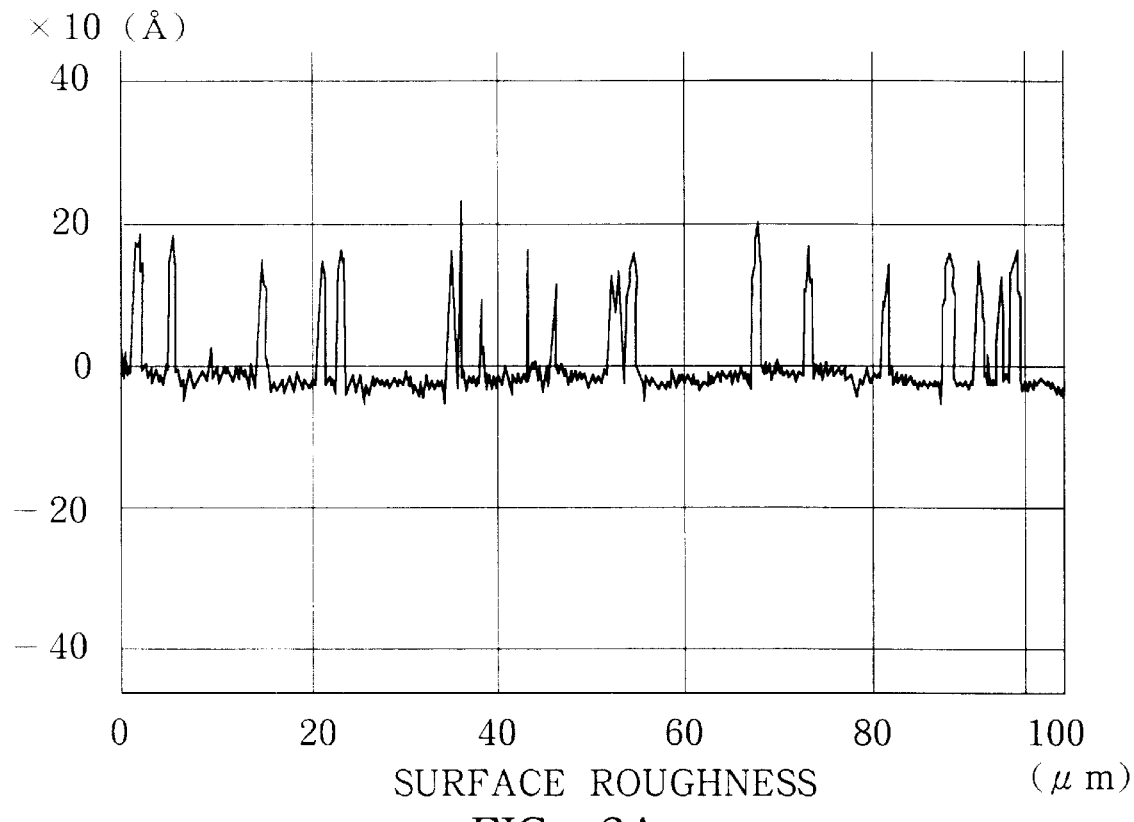
FIGS. 2A and 2B are graphs showing profiles after polishing of another example of the magnetic disk substrate made of the glass-ceramic according to the invention.
Figure 2B:
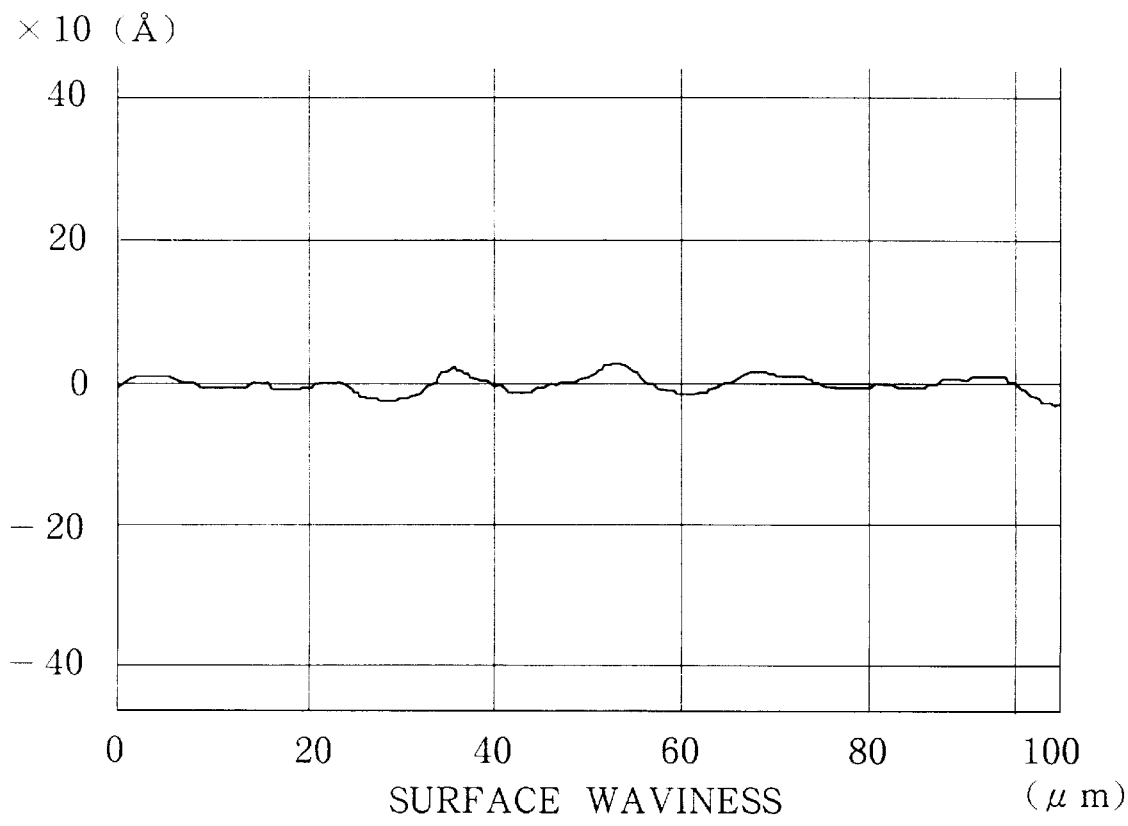

For manufacturing a glass-ceramic of another example, materials including 75.7% $SiO_2$, 11.0% $Li_2O$, 3.3% $Al_2O_3$, 3.0% MgO, 0.5% ZnO, 4.0% $K_2O$ and 2.0% $P_2O_5$ were mixed and molten in a conventional melting apparatus at a temperature within the range from about 1350° C. to about 1500° C. The molten glass was stirred to homogenize it and thereafter formed into a desired shape and annealed to provide a formed glass. Then, this formed glass was subjected to a heat treatment to produce the crystal nucleus at 540° C. for about five hours and then was subjected to further heat treatment for crystallization at 740° C. for six hours to produce a glass-ceramic having lithium disilicate ($Li_2O\cdot 2SiO_2$) and alpha-quartz (alpha-$SiO_2$) as predominant crystal phases, said crystal phase of alpha-quartz being formed of grown crystal grains each having a globular grain structure made of aggregated particles. An average grain diameter of the globular grains of alpha-quartz was 0.6 $\mu$m according to an observation through an electronic microscope. The same lapping and polishing processing as applied to Example 1 were applied to this formed glass-ceramic to produce a magnetic disk substrate. This magnetic disk substrate had Ra of 30Å, Rp of 171Å and Wa of 13Å. The surface profiles of this magnetic disk substrate is shown in FIGS. 2A and 2B. FIG. 2A shows the surface roughness and FIG. 2B the surface waviness.

The same film forming processing as was applied to the glass-ceramic substrate of Example 1 was applied to this glass-ceramic substrate to produce a magnetic disk and measured GABP was 0.80 $\mu$".

Comparative Example 1

Figure 3A:
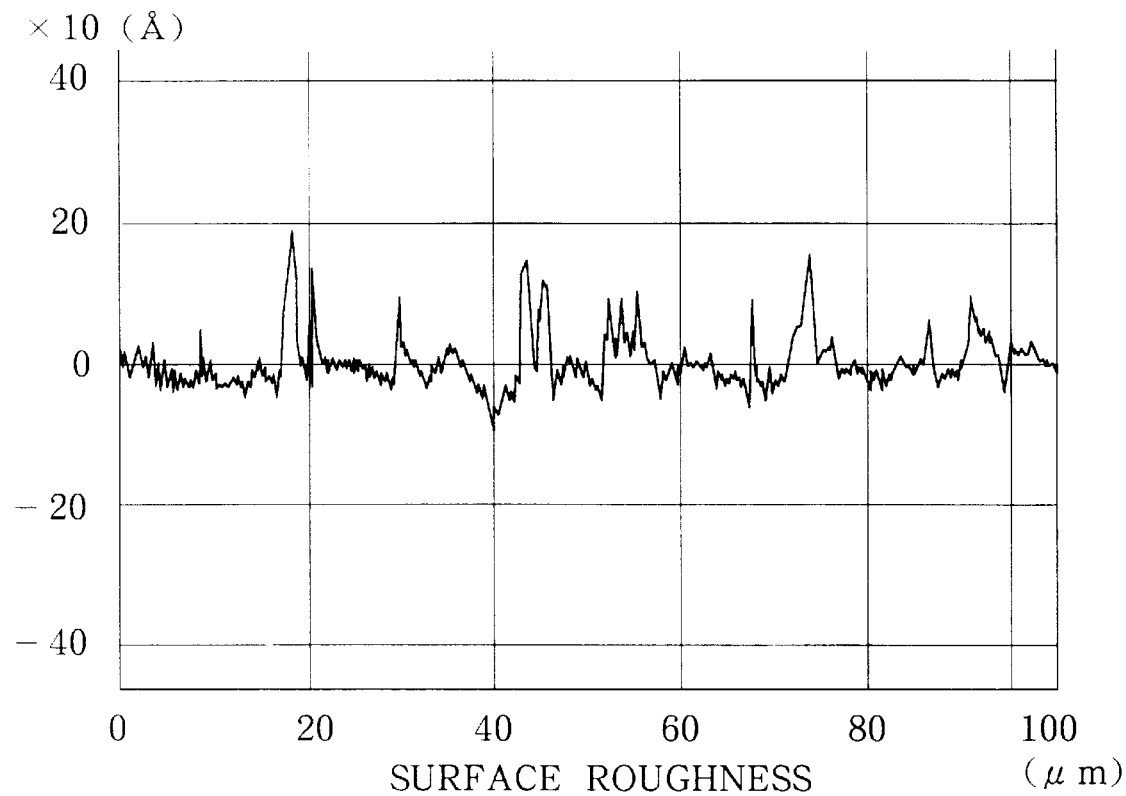
FIGS. 3A and 3B are graphs showing profiles after polishing of a comparative example of a magnetic disk substrate made of a glass-ceramic.
Figure 3B:
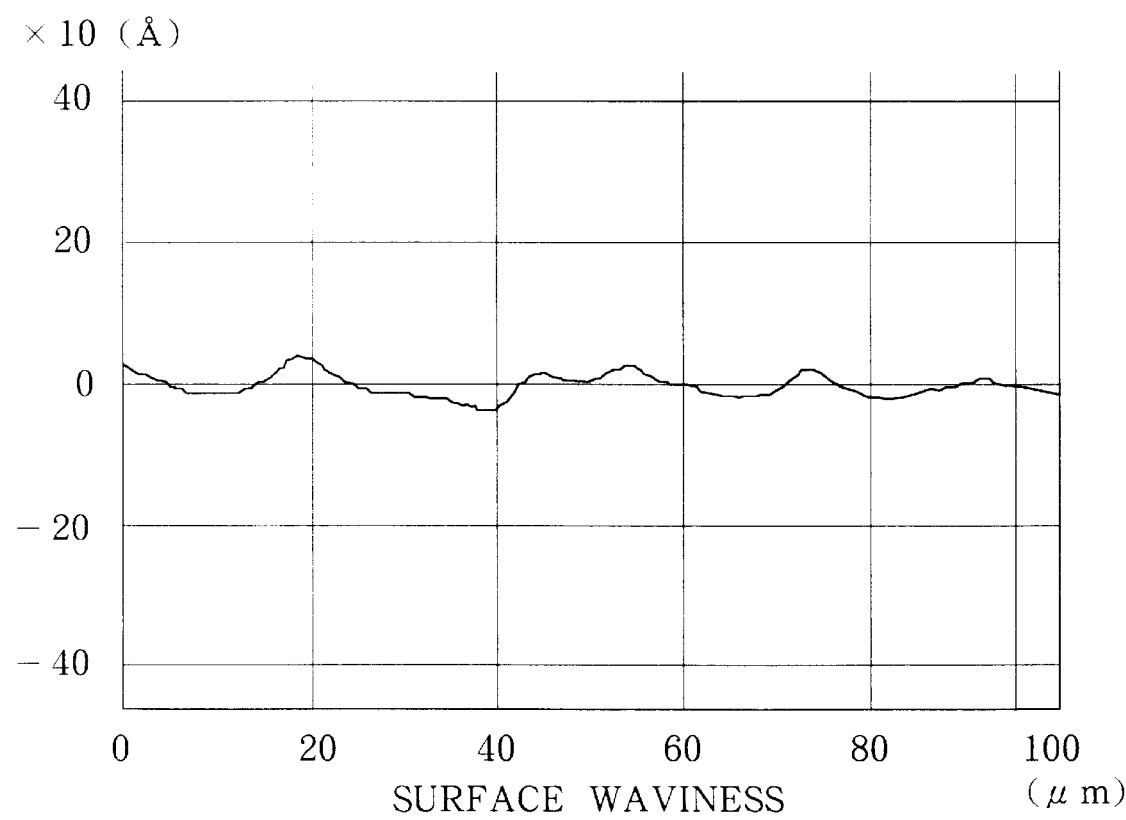

A magnetic disk substrate was produced in the same manner as in Example 1 except that polishing was performed by using only a cerium oxide polishing material having an average grain diameter of 1.2 $\mu$m. This magentic disk substrate had Ra of 19Å, Rp of 116Å and Wa of 12Å. The surface profiles of this magnetic disk substrate are shown in FIGS. 3A and 3B. FIG. 3A shows the surface roughness and FIG. 3B the surface waviness.

The same film forming processing as was applied in Example 1 was applied to this glass-ceramic substrate to produce a magnetic disk and measured GABP was 0.85 $\mu$".

Comparative Example 2

Figure 4A:
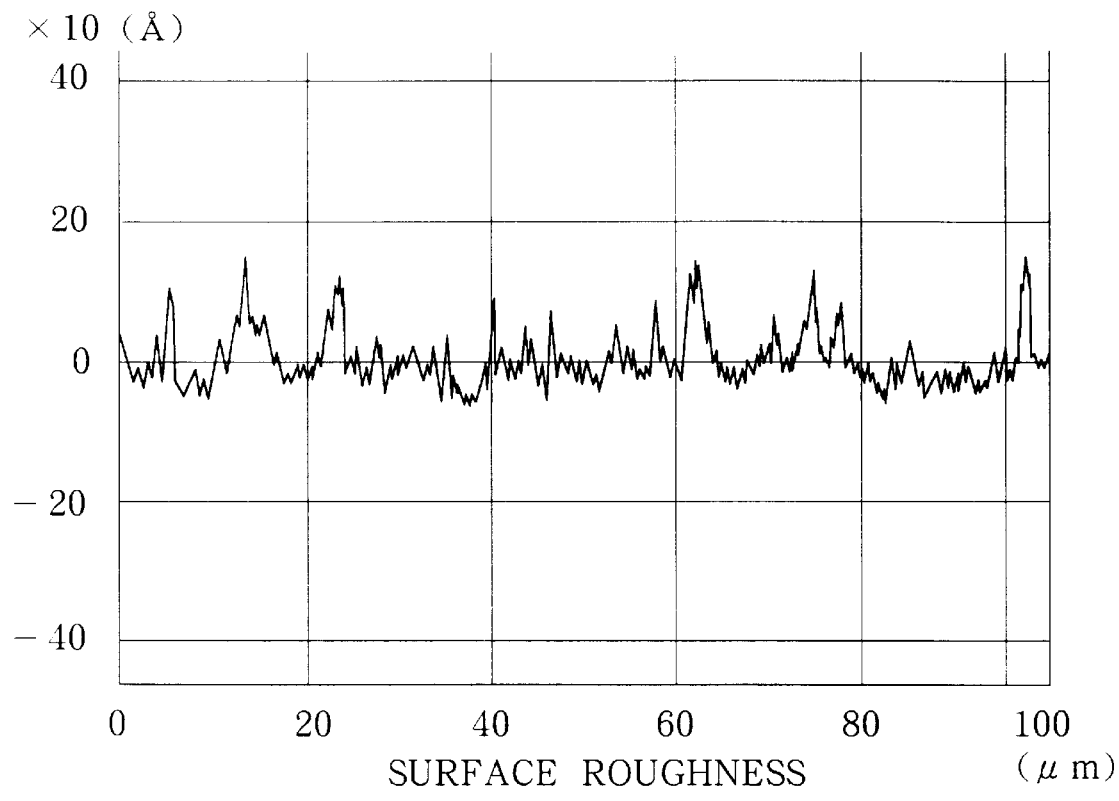
FIGS. 4A and 4B are graphs showing profiles after polishing of another comparative example of a magnetic disk substrate made of a glass-ceramic.
Figure 4B:
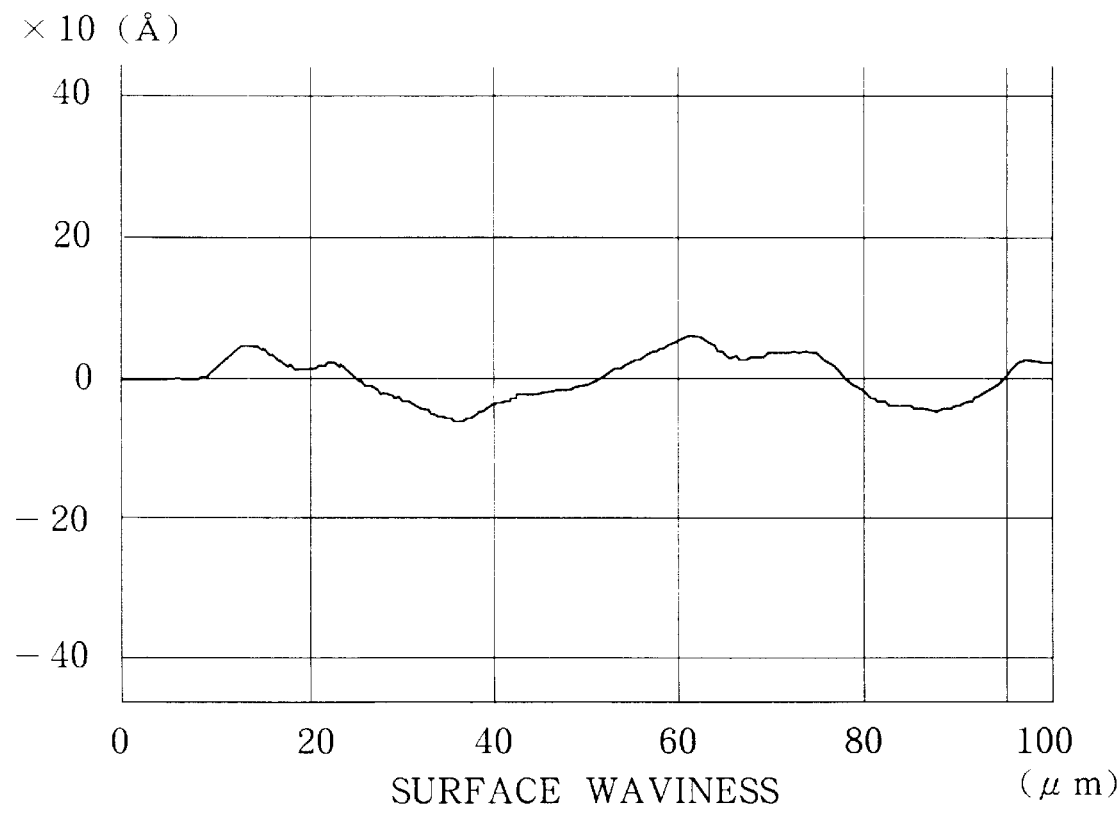

A magnetic disk substrate was produced in the same manner as in Example 2 except that polishing was performed by using only a cerium oxide polishing material having an average grain diameter of 1.2 $\mu$m. This magentic disk substrate had Ra of 32Å, Rp of 162Å and Wa of 19Å. The surface profiles of this magnetic disk substrate are shown in FIGS. 4A and 4B. FIG. 4A shows the surface roughness and FIG. 4B the surface waviness.

The same film forming processing as was applied in Example 2 was applied to this glass-ceramic substrate to produce a magnetic disk and measured GABP was 0.99 $\mu$".

Comparison of Examples 1 and 2 wih Comperative Examples 1 and 2

Ra, Rp, Wa and GABP of the Examples 1 and 2 and those of the Comperative Examples 1 and 2 are shown in the following Table:

TABLE

|  | Example 1 | Example 2 | Comparative Example 1 | Comparative Example 2 |
|---|---|---|---|---|
| Ra(Å) | 18 | 32 | 19 | 32 |
| Rp(Å) | 127 | 171 | 116 | 162 |
| Wa(Å) | 9 | 13 | 12 | 19 |
| Wa/Ra | 0.50 | 0.43 | 0.63 | 0.59 |
| GABP($\mu$") | 0.61 | 0.80 | 0.85 | 0.99 |

From this table, it will be understood that Wa/Ra of Examples 1 and 2 is 0.50 or less whereas Wa/Ra of Comparative Examples exceeds 0.50 and that GABP of Exmples 1 and 2 is 0.80 $\mu$" or less whereas GABP of Comparative Examples 1 and 2 exceeds 0.80 $\mu$".

Figure 5:
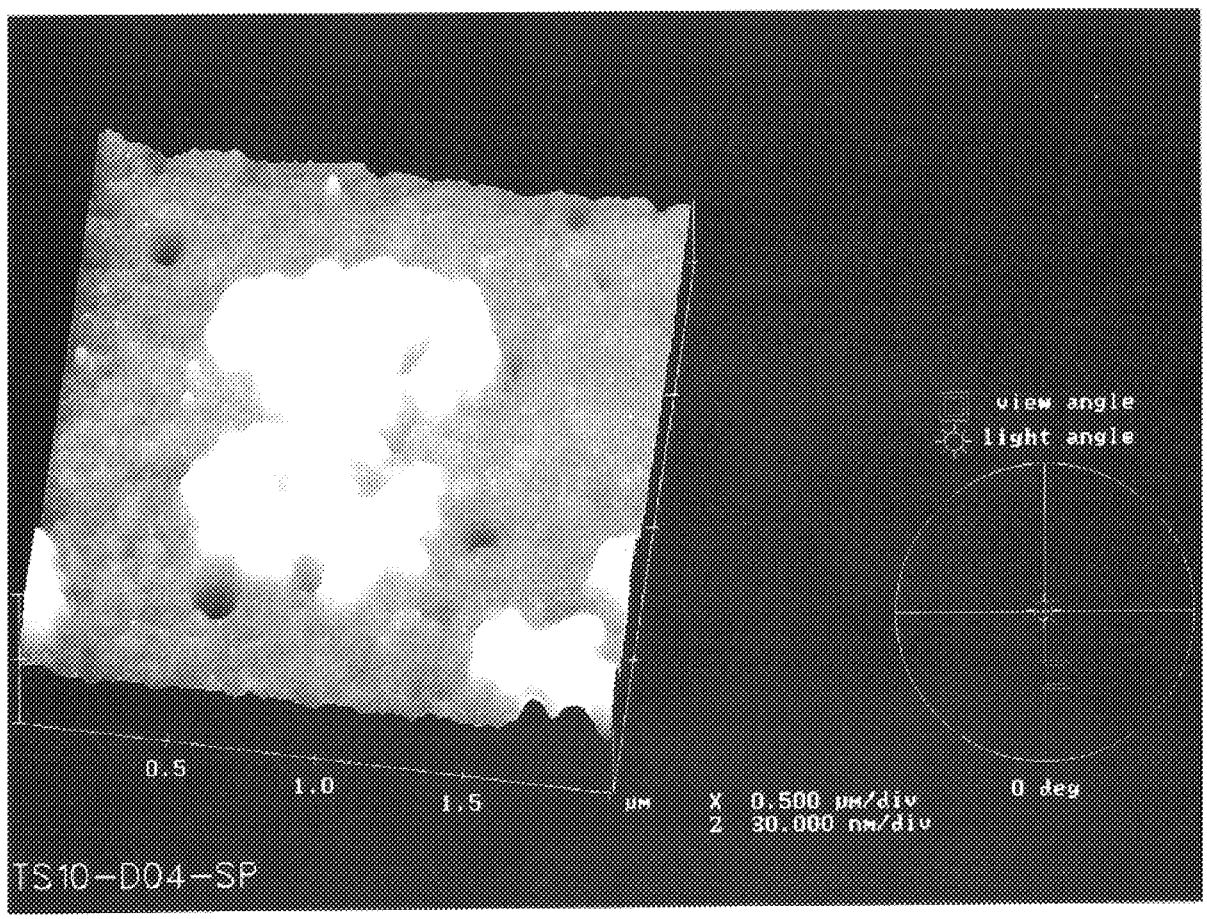
FIG. 5 is a photograph showing a three-dimensional AFM (atomic force microscope) image of the surface after polishing of the glass-ceramic substrate of Example 1 of the invention.
Figure 6:
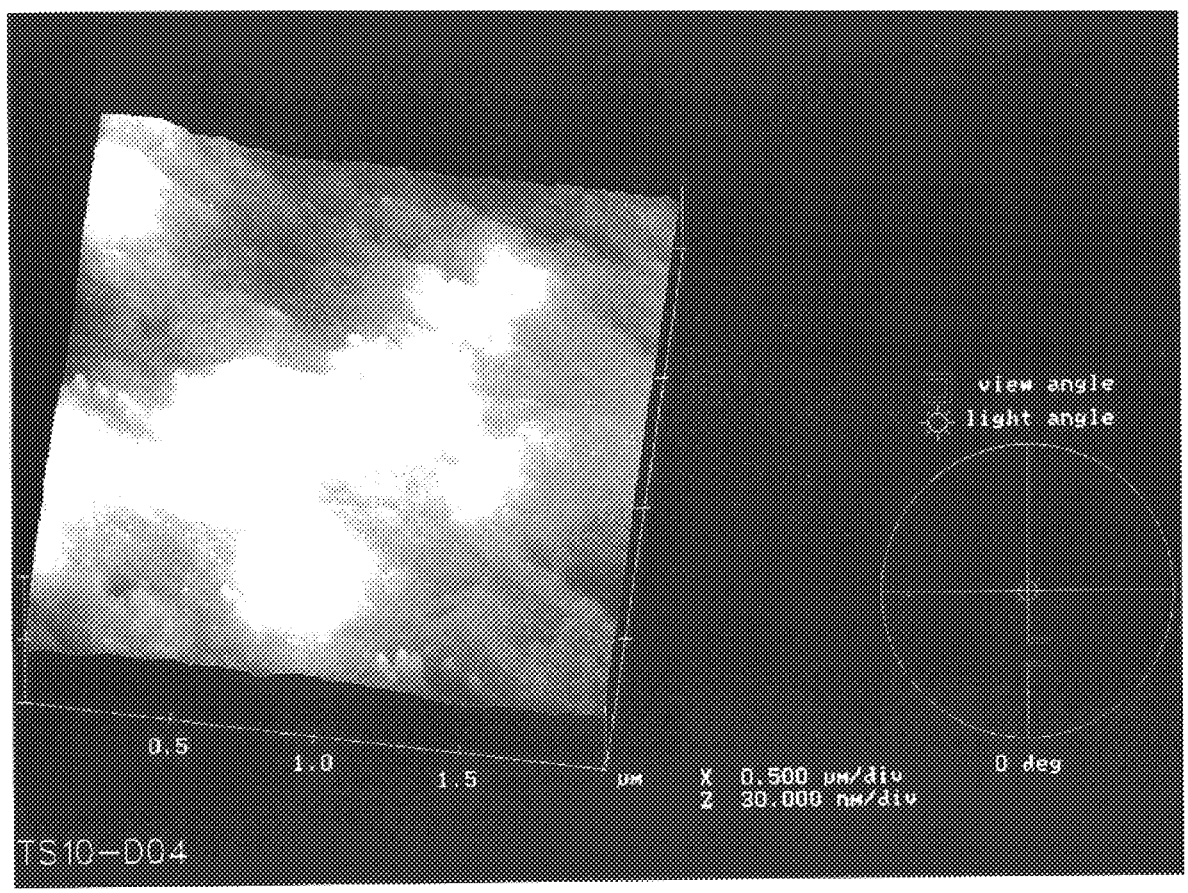
FIG. 6 is a photograph showing a three-dimensional AFM image of the surface of the glass-ceramic substrate of Comparative Example 1.

Further, as will be apparent from the photographs of FIGS. 5 and 6, in Example 1, the crystal grains of alpha-quartz project from the surface of the lithium disilicate crystal phase at a substantially uniform height and, besides, the lithium disilicate crystal phase in the portion between respective crystal grains of alpha-quartz exhibits a substantially flatly polished surface whereas, in Comparative Example 1, the crystal grains of alpha-quartz project at a height which is not uniform and, moreover, undulations (i.e., waviness) are formed on the surface of the lithium disilicate crystal phase.

As will be understood from the above, according to the present invention, by polishing a glass-ceramic substrate with a polishing material having a grain diameter smaller than the diameter of crystal grains of the glass-ceramic substrate, the crystal grains project at a substantially uniform height and a portion between the crystal grains is polished substantially flatly so that the surface waviness is reduced and a desired glide height of GABP 0.8 $\mu$" or below can thereby be obtained.

What is claimed is:

1. A method for manufacturing a magnetic disk substrate comprising a step of polishing a glass-ceramic having a crystal phase consisting of crystal grains having an average diameter of less than 3 $\mu$m with a polishing material having a grain diameter smaller than the diameter of the crystal grains.

2. A method as defined in claim 1 wherein said glass-ceramic includes lithium disilicate ($Li_2O\cdot 2SiO_2$) and alpha-quartz (alpha-$SiO_2$) as predominant crystal phases and grown crystal grains of the alpha-quartz each have a globular grain structure consisting of aggregated particles and have a diameter within a range of 0.3 $\mu$m–3.0$\mu$m.

3. A method as defined in claim 2 wherein said glass-ceramic is obtained by subjecting to a heat treatment a base glass which consists in weight percent of 65–83% $SiO_2$, 8–13% $Li_2O$, 0–7% $K_2O$, 0.5–5.5% MgO+ZnO+PbO in which 0.5–5.5% MgO, 0–5% ZnO, 0–5% PbO, 1–4% $P_2O_5$, 0–7% $Al_2O_3$, 0–2% $As_2O_3+Sb_2O_3$.

4. A method as defined in claim 2 wherein said polishing material having a grain diameter smaller than the diameter of the crystal grains is colloidal silica.

5. A method for manufacturing a magnetic disk substrate comprising a step of polishing a glass-ceramic having a crystal phase consisting of crystal grains having an average diameter of less than 3 $\mu$m with a polishing material having a grain diameter which is substantially equal to or larger than the diameter of the crystal grains and a step of polishing the glass-ceramic thereafter with a polishing material having a grain diameter smaller than the diameter of the crystal grains.

6. A method as defined in claim 5 wherein said glass-ceramic includes lithium disilicate ($Li_2O \cdot 2SiO_2$) and alpha-quartz (alpha-$SiO_2$) as predominant crystal phases and grown crystal grains of the alpha-quartz each have a globular grain structure consisting of aggregated particles and have a diameter within a range of 0.3 $\mu$m–3.0 $\mu$m.

7. A method as defined in claim 6 wherein said glass-ceramic is obtained by subjecting to a heat treatment a base glass which consists in weight percent of 65–83% $SiO_2$, 8–13% $Li_2O$, 0–7% $K_2O$, 0.5–5.5% MgO+ZnO+PbO in which 0.5–5.5% MgO, 0–5% ZnO, 0–5% PbO, 1–4% $P_2O_5$, 0–7% $Al_2O_3$, 0–2% $As_2O_3$+$Sb_2O_3$.

8. A method as defined in claim 6 wherein said polishing material having a grain diameter smaller than the diameter of the crystal grains is colloidal silica.

* * * * *